(12) United States Patent
Kim et al.

(10) Patent No.: US 9,304,642 B2
(45) Date of Patent: Apr. 5, 2016

(54) TOUCH SENSOR COMPRISING MESH PATTERN WITH IRREGULAR SHAPE

(71) Applicant: SAMSUNG ELECTRO-MECHANICS CO., LTD., Suwon-Si (KR)

(72) Inventors: Hee Soo Kim, Suwon-Si (KR); Sang Su Hong, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 78 days.

(21) Appl. No.: 14/250,199

(22) Filed: Apr. 10, 2014

(65) Prior Publication Data

US 2014/0320448 A1  Oct. 30, 2014

(30) Foreign Application Priority Data

Apr. 30, 2013  (KR) .................. 10-2013-0048573

(51) Int. Cl.
*G06F 3/044* (2006.01)

(52) U.S. Cl.
CPC ...... *G06F 3/044* (2013.01); *G06F 2203/04112* (2013.01)

(58) Field of Classification Search
CPC .......... G06F 2203/04112; G06F 3/044; H05K 1/0296; H05K 1/09; H05K 2201/09681
See application file for complete search history.

(56) References Cited

U.S. PATENT DOCUMENTS

| | | | | |
|---|---|---|---|---|
| 2011/0007011 A1* | 1/2011 | Mozdzyn | ....................... | 345/173 |
| 2011/0102361 A1* | 5/2011 | Philipp | ......................... | 345/174 |
| 2012/0062510 A1 | 3/2012 | Mo | | |
| 2012/0262382 A1* | 10/2012 | Guard et al. | .................. | 345/173 |
| 2013/0004709 A1* | 1/2013 | Mizuno et al. | ................ | 428/138 |
| 2013/0113502 A1* | 5/2013 | Yilmaz | .................. | G06F 3/044 324/649 |
| 2013/0127775 A1* | 5/2013 | Yilmaz | .................. | G06F 3/044 345/174 |
| 2013/0155001 A1* | 6/2013 | Yilmaz | .................. | G06F 3/044 345/174 |
| 2013/0299214 A1* | 11/2013 | Frey | ..................... | H05K 9/0096 174/253 |
| 2014/0168092 A1* | 6/2014 | Yilmaz | .................. | G06F 3/044 345/173 |
| 2014/0198264 A1* | 7/2014 | Gao et al. | ......................... | 349/12 |
| 2014/0216785 A1* | 8/2014 | Zhou et al. | .................... | 174/250 |
| 2014/0218642 A1* | 8/2014 | Iwami | ............................. | 349/12 |

* cited by examiner

*Primary Examiner* — Lun-Yi Lao
*Assistant Examiner* — Elliot Deaderick
(74) *Attorney, Agent, or Firm* — NSIP Law

(57) ABSTRACT

Disclosed herein is a touch sensor, including: a transparent substrate; and an electrode pattern formed on the transparent substrate, wherein the electrode pattern is formed in a mesh pattern and the mesh pattern includes at least one of the irregular unit patterns. Each unit pattern forming the mesh pattern may be formed in a polygonal shape.

9 Claims, 6 Drawing Sheets

TOUCH SENSOR COMPRISING MESH PATTERN WITH IRREGULAR SHAPE

CROSS REFERENCE TO RELATED APPLICATION

This application claims the benefit of Korean Patent Application No. 10-2013-0048573, filed on Apr. 30, 2013, entitled "Touch Sensor", which is hereby incorporated by reference in its entirety into this application.

BACKGROUND OF THE INVENTION

1. Technical Field

The present invention relates to a touch sensor.

2. Description of the Related Art

In accordance with the growth of computers using a digital technology, devices assisting computers have also been developed, and personal computers, portable transmitters and other personal information processors execute processing of text and graphic using a variety of input devices such as a keyboard and a mouse.

In accordance with the rapid advancement of an information-oriented society, the use of computers has gradually been widened; however, it is difficult to efficiently operate products using only a keyboard and a mouse currently serving as an input device. Therefore, the necessity for a device that is simple, has minimum malfunction, and is capable of easily inputting information has increased.

In addition, current techniques for input devices have progressed toward techniques related to high reliability, durability, innovation, designing and processing beyond the level of satisfying general functions. To this end, a touch sensor has been developed as an input device capable of inputting information such as text, graphics, or the like.

This touch sensor is mounted on a display surface of a display such as an electronic organizer, a flat panel display device including a liquid crystal display (LCD) device, a plasma display panel (PDP), an electroluminescence (El) element, or the like, or a cathode ray tube (CRT) to thereby be used to allow a user to select desired information while viewing the display.

In addition, the touch sensor is classified into a resistive type touch panel, a capacitive type touch panel, an electromagnetic type touch panel, a surface acoustic wave (SAW) type touch panel, and an infrared type touch panel. These various types of touch sensors are adapted for electronic products in consideration of a signal amplification problem, a resolution difference, a level of difficulty of designing and processing technologies, optical characteristics, electrical characteristics, mechanical characteristics, resistance to an environment, input characteristics, durability, and economic efficiency. Currently, the resistive type touch sensor and the capacitive type touch sensor have been prominently used in a wide range of fields.

In the prior art, as described in US Patent Laid-Open Publication No. 20120062510, in the case in which a mesh pattern is used as an electrode pattern of the touch sensor, a moiré phenomenon according to a regular mesh shape may be generated. The above-mentioned moiré phenomenon degrades the entire visibility of the touch sensor. As the moiré phenomenon generated by a regular metal pattern forming the mesh pattern affects the entire visibility of the touch sensor, resolution of image quality of an image output from a display and other associated output images, or reliability of other images may be degraded.

PRIOR ART DOCUMENT

Patent Document (Patent Document 1) US20120062510 A1

SUMMARY OF THE INVENTION

The present invention has been made in an effort to provide a touch sensor capable of preventing a moiré phenomenon which may be generated from an intersection between electrode patterns or a relationship between the electrode pattern and a black matrix of a display to improve visibility of the touch sensor by forming the electrode pattern of the touch sensor in a mesh pattern having an irregular polygonal shape.

According to a preferred embodiment of the present invention, there is provided a touch sensor, including: a transparent substrate; and an electrode pattern formed on the transparent substrate, wherein the electrode pattern is formed in a mesh pattern and the mesh pattern includes at least one of the irregular unit patterns.

Assuming that a value dividing radius r of at least one of the unit patterns included in the electrode pattern by an average radius of all the unit patterns is an X-axis and frequency of the unit pattern is a Y-axis, when setting the X-axis as a log axis and defining standard deviation as σ, the following relationship equation may be represented, $$f(r) = \frac{1}{\sigma\sqrt{2\pi}} \exp\left(-\frac{r^2}{2\sigma^2}\right)$$

wherein, a value of σ may satisfy the relationship equation so as to be above 0 to 1 or less.

The electrode pattern may be formed of copper (Cu), aluminum (Al), gold (Au), silver (Ag), titanium (Ti), palladium (Pd), chromium (Cr), nickel (Ni) or a combination thereof.

According to another preferred embodiment of the present invention, there is provided a touch sensor, including: a transparent substrate, first electrode patterns formed to be in parallel with one another in one direction on one surface of the transparent substrate, and second electrode patterns formed on the other surface of the transparent substrate and formed in a direction intersected with the first electrode pattern, wherein the first electrode pattern and the second electrode pattern are formed in a mesh pattern and the mesh pattern includes at least one of the irregular unit patterns.

Assuming that a value dividing radius r of at least one of the unit patterns included in the first electrode pattern or the second electrode pattern by an average radius of all the unit patterns is an X-axis and frequency of the unit pattern is a Y-axis, when setting the X-axis as a log axis and defining standard deviation as σ, the following relationship equation may be represented, $$f(r) = \frac{1}{\sigma\sqrt{2\pi}} \exp\left(-\frac{r^2}{2\sigma^2}\right)$$

wherein, a value of σ may satisfy the relationship equation so as to be above 0 to 1 or to less.

The electrode pattern may be formed of copper (Cu), aluminum (Al), gold (Au), silver (Ag), titanium (Ti), palladium (Pd), chromium (Cr), nickel (Ni) or a combination thereof.

According to still another preferred embodiment of the present invention, there is provided a touch sensor, including: a first transparent substrate; first electrode patterns formed to be in parallel with one another in one direction on one surface of the first transparent substrate; a second transparent substrate; and second electrode patterns formed to be in parallel with one another in a direction intersected with the first electrode patterns on one surface of the second transparent substrate, wherein the first electrode pattern and the second electrode pattern may be formed in a mesh pattern, the mesh pattern may be formed by at least one of the irregular unit patterns, and the first transparent substrate and the second transparent substrate may be bonded so that the other surface of the first transparent substrate faces the second electrode patterns of the second transparent substrate.

Assuming that a value dividing radius r of at least one of the unit patterns included in the first electrode pattern or the second electrode pattern by an average radius of all the unit patterns is an X-axis and frequency of the unit pattern is a Y-axis, when setting the X-axis as a log axis and defining standard deviation as σ, the following relationship equation may be represented, $$f(r) = \frac{1}{\sigma\sqrt{2\pi}} \exp\left(-\frac{r^2}{2\sigma^2}\right)$$

wherein, a value of σ may satisfy the relationship equation so as to be above 0 to 1 or less.

The electrode pattern may be formed of copper (Cu), aluminum (Al), gold (Au), silver (Ag), titanium (Ti), palladium (Pd), chromium (Cr), nickel (Ni) or a combination thereof.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
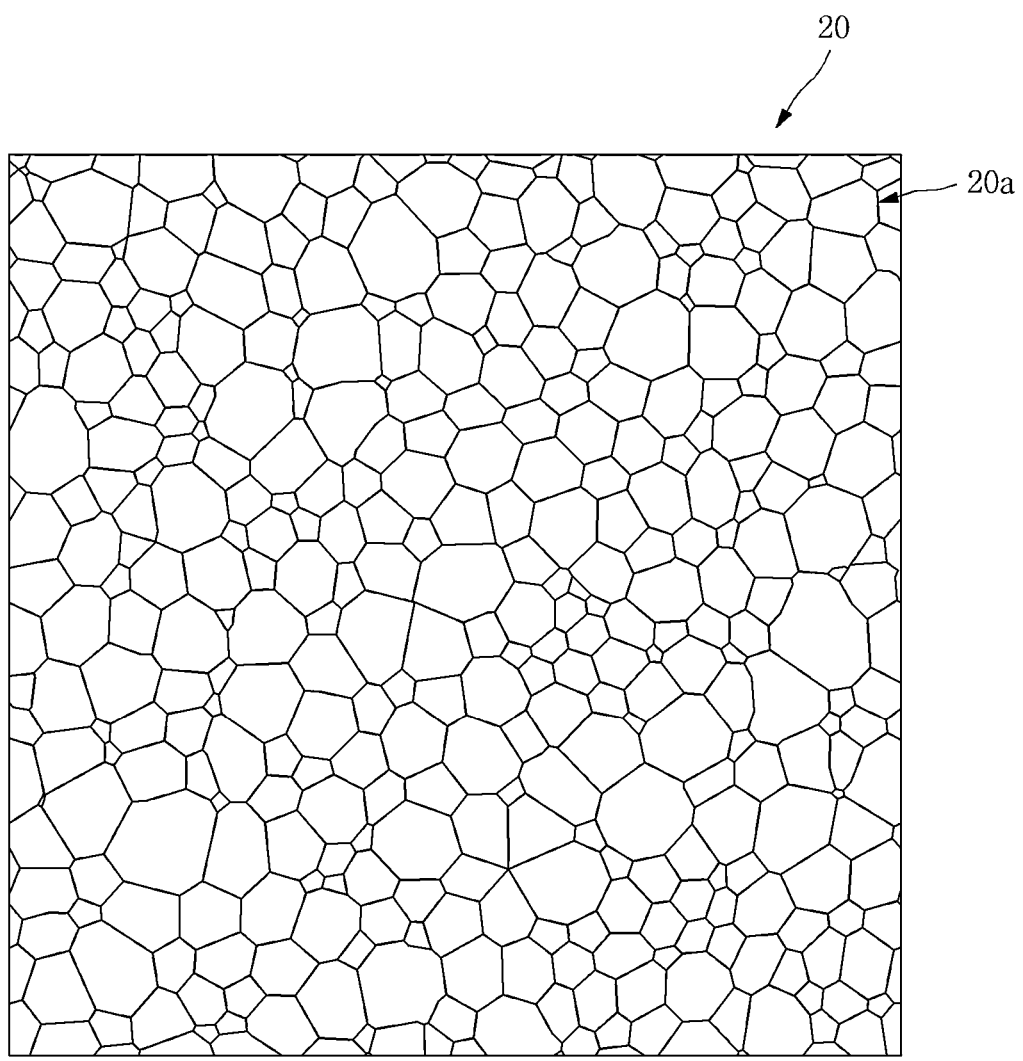
FIG. 1 is a view of an electrode pattern including an irregular unit pattern according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
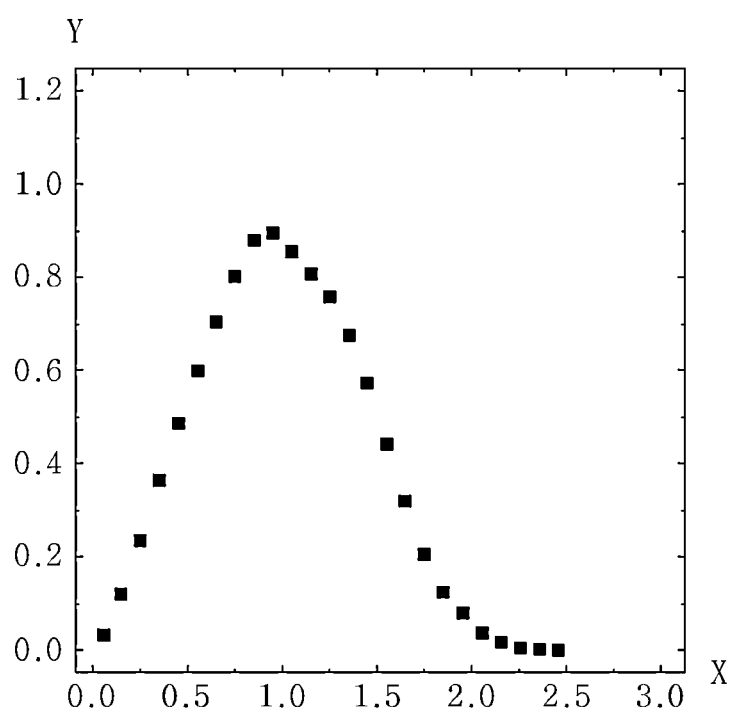
FIG. 2 is a graph showing a relationship equation 1 according to the preferred embodiment of the present invention.
Figure 3:
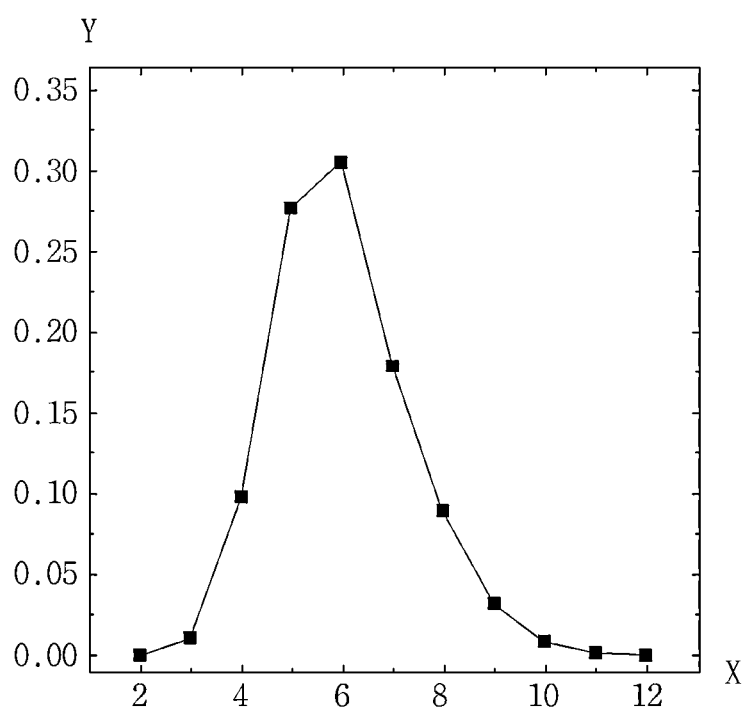
FIG. 3 is a graph showing a relationship with respect to the number of vertexes formed in the unit pattern forming the electrode pattern of a touch sensor and the frequency thereof according to a preferred embodiment of the present invention.
Figure 4:
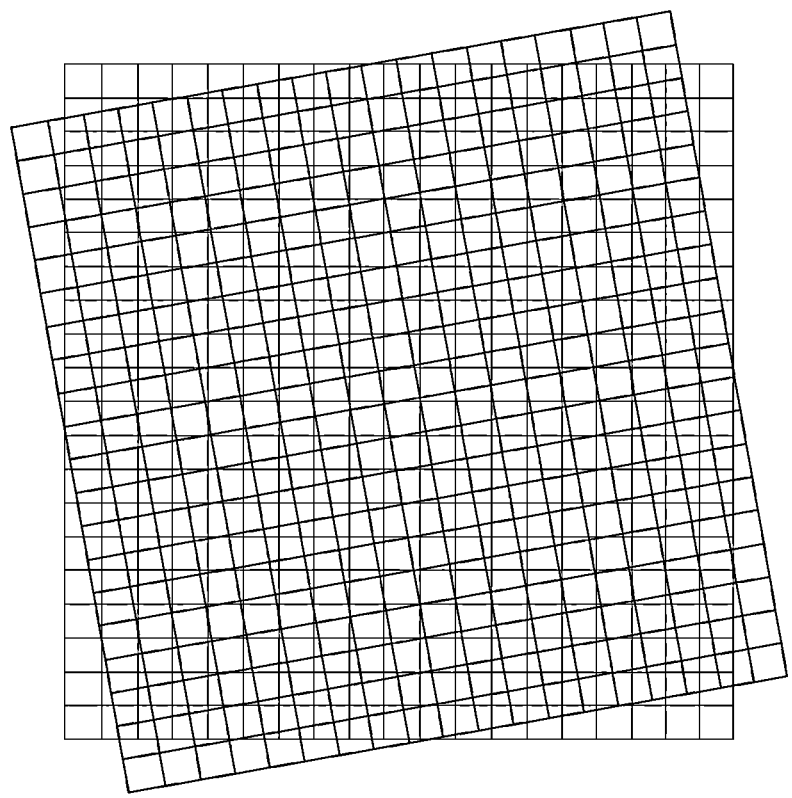
FIG. 4 is a reference view showing a moiré phenomenon according to a comparative example of a pattern according to the preferred embodiment of the present invention.
Figure 5:
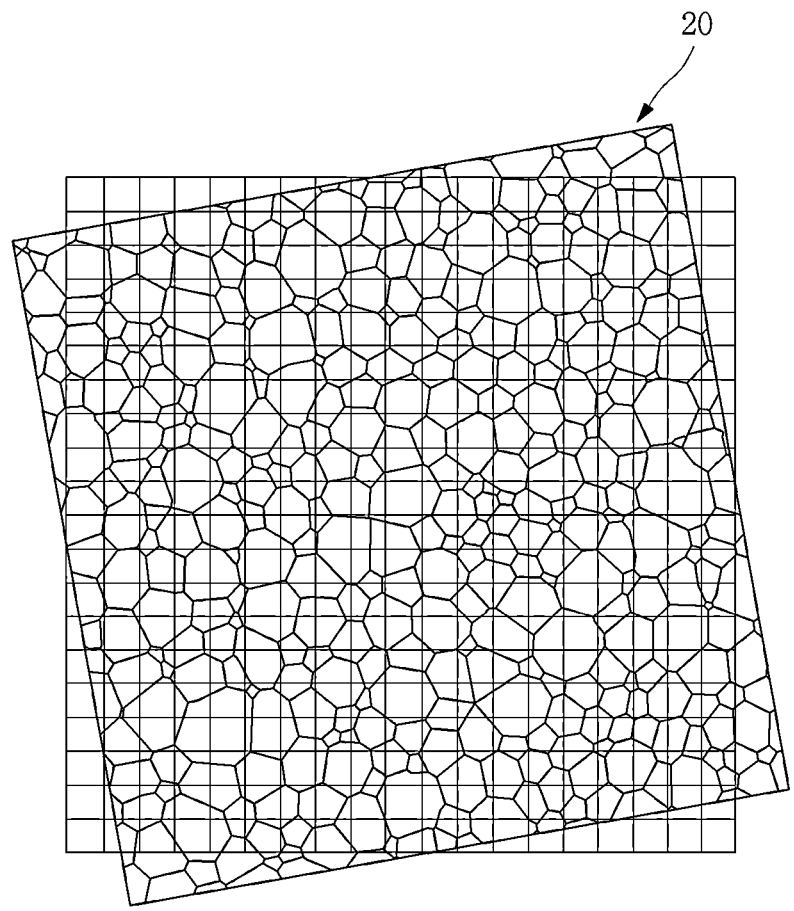
FIG. 5 is a reference view showing a case in which the moiré phenomenon is not generated in the electrode pattern according to the preferred embodiment of the present invention.

FIG. 1 is a view of an electrode pattern including an irregular unit pattern according to a preferred embodiment of the present invention, FIG. 2 is a graph showing a relationship equation 1 according to the preferred embodiment of the present invention, FIG. 3 is a graph showing a relationship with respect to the number of vertexes formed in the unit pattern forming the electrode pattern of a touch sensor and the frequency thereof according to a preferred embodiment of the present invention, FIG. 4 is a reference view showing a moiré phenomenon according to a comparative example of a pattern according to the preferred embodiment of the present invention, and FIG. 5 is a reference view showing a case in which the moiré phenomenon is not generated in the electrode pattern according to the preferred embodiment of the present invention.

The touch sensor according to the preferred embodiment of the present invention includes a transparent substrate and an electrode pattern 20 formed on the transparent substrate, when the electrode pattern 20 is formed in a mesh pattern and the mesh pattern includes at least one of irregular unit patterns 20a.

The transparent substrate 10 may be made of polyethylene terephthalate (PET), polycarbonate (PC), poly methyl methacrylate (PMMA), polyethylene naphthalate (PEN), polyethersulfone (PES), cyclic olefin polymer (COC), triacetylcellulose (TAC) film, polyvinyl alcohol (PVA) film, polyimide (PI) film, polystyrene (PS), biaxially stretched polystyrene (K resin containing biaxially oriented PS; BOPS), glass, or tempered glass, but is not particularly limited thereto as long as it is a material having a predetermined strength or more. In addition, since the transparent substrate 10 may have a transparent electrode formed on one surface thereof, a surface treatment layer may be formed by performing high frequency treatment, primer treatment, or the like on one surface of the transparent substrate 10 in order to improve adhesion between the transparent substrate 10 and the transparent electrode.

The electrode pattern 20 may be formed on the transparent substrate 10. The electrode pattern 20 serves to generate a signal by an input unit of a touch to thereby enable a controller unit (not shown) to recognize a touch coordinate. In a case of a capacitive type, the electrode pattern 20 may sense change in capacitance and recognize a coordinate value of a touch point to thereby represent an output value at the time of the touch, and also in a case of a resistive type, the electrode pattern 20 may recognize the touch point according to change in resistance generated due to contact between the electrodes by a predetermined pressure to thereby represent the output value.

The electrode pattern 20 may be formed in a mesh pattern using copper (Cu), aluminum (Al), gold (Au), silver (Ag), titanium (Ti), palladium (Pd), chromium (Cr), nickel (Ni) or a combination thereof. Particularly, at least one of the unit patterns 20a is continuously arranged, such that the mesh pattern may be formed. Here, the unit pattern 20a may have a rectangular shape, a triangular shape, a diamond shape and other various polygonal shape, but is not particularly limited thereto.

The electrode pattern 20 may be an electrode pattern 20 having a single layer structure formed on one transparent substrate 10 and as in another embodiment to be described blow, may also be formed to be combined as two electrode pattern layers of a first electrode pattern 21 and a second electrode pattern 22. The present invention is to improve entire visibility of the touch sensor by decreasing the visibility of the mesh pattern in the case in which the electrode pattern 20 is configured by the mesh pattern using a metal.

In the case in which the touch sensor is coupled to the display unit (not shown), according to the prior art, in order to prevent the moiré phenomenon which may be generated when combining with the pattern such as the black matrix formed on the display unit, there was a problem in that a mesh design needs to be performed using period information of the black matrix or the mesh design needs to be performed by considering various variables such as period of pixel or sub-pixel of the display unit and an arrangement method (stripe, mosaic, delta methods, and the like) of RGB colors.

However, in order to prevent the moiré phenomenon which may be generated between the above-mentioned patterns, the present invention forms irregularly the mesh design of the electrode pattern 20 by combining at least one of the unit patterns 20a, thereby making it possible to improve the visibility of the touch sensor. Particularly, in the irregular mesh patterns generally used according to the prior art in order to combine the irregular unit patterns 20a, there were problems in that it is very complicated to manufacture or generate the pattern, reliability of electrical and optical characteristics is degraded, or the like. However, as shown in FIG. 1, the present invention may perform the design of the electrode pattern 20 having higher reliability by forming the electrode pattern 20 by a specific relationship equation to be described below in order to implement the irregular pattern and easily form the pattern in a process of implementing the above-mentioned irregular pattern, and to maintain uniformity of optical and electrical characteristics at the time of forming the pattern.

The electrode pattern 20 according to the preferred embodiment of the present invention may be formed in the mesh pattern and each unit pattern 20a forming the mesh pattern may be formed in a polygonal shape as shown in FIG. 1.

First, as shown in FIG. 2, in order to form the irregular mesh pattern, assuming that a value dividing a radius of an individual unit pattern 20a by an average value of radius values of the respective unit patterns 20a forming the mesh pattern is a value of an X-axis and a frequency of the corresponding unit pattern 20a is a Y-axis, a graph as shown in FIG. 2 may be represented.

Distribution represented by rectangular points may not be specifically specified by a relationship equation with respect to a size of the radius of the unit pattern 20a and the frequency of the unit pattern 20a according to the present invention. However, when setting the radius of the unit pattern 20a of the X-axis as a log axis and defining standard deviation as σ, the tendency represented by the rectangular points may satisfy the following relationship equation 1.

$$f(r) = \frac{1}{\sigma\sqrt{2\pi}} \exp\left(-\frac{r^2}{2\sigma^2}\right) \qquad (1)$$

However, in this case, the standard deviation may be set to be greater than 0 and to be 1 or less. σ is defined so as not to include 0.

That is, assuming that a value dividing radius r of at least one of the unit patterns included in the electrode pattern by an average radius of all the unit patterns is the X-axis and the frequency of the unit pattern is the Y-axis, when setting the X-axis as the log axis and defining the standard deviation as σ, the following equation may be represented.

$$f(r) = \frac{1}{\sigma\sqrt{2\pi}} \exp\left(-\frac{r^2}{2\sigma^2}\right)$$

Where, σ value may be set so as to be a value of above 0 to 1 or less.

In addition, a concept of the radius, which means a radius value calculated by assuming the unit pattern 20a having the polygonal shape as one circle, may be defined as the radius value calculated from an approximately circular shape formed by connecting outer peripheries of various polygons shown in FIG. 1.

In addition, as shown in FIG. 3, the irregular mesh pattern may be formed by the relationship equation with respect to the number of vertexes each formed at the unit patterns 20a formed in the polygonal shape and the number of unit patterns 20a. In a graph shown in FIG. 3, assuming that the X axis is the number of vertexes forming the unit pattern 20a and the Y axis is the frequency r, accordingly, the average value of the distribution in the distribution may be defined as 5 to 8.

In addition to the relationship equation 1, as shown in FIG. 3, the unit pattern 20a capable of satisfying the average value of the distribution with respect to the number of vertexes of the unit pattern 20a and the frequency thereof as 5 to 8 may be designed.

FIGS. 4 and 5 are views showing results for the moiré phenomenon viewed when the mesh pattern designed according to the preferred embodiment of the present invention and a general mesh pattern according to the prior art are overlapped.

From FIG. 4, it may be appreciated that when two patterns having a regular arrangement are formed to be inclined to each other in the general mesh pattern according to the prior art, the moiré phenomenon visually appears. The moiré phenomenon generates a moiré anywhere when patterns having a predetermined interval are repeatedly overlapped. As a result, when the moiré phenomenon is generated on the electrode pattern 20 of the touch sensor, the mesh pattern made of an opaque metal material is significantly recognized by a user, such that the visibility of the touch sensor is degraded, thereby making it possible to also affect the visibility of the image output from the display unit coupled to the touch sensor.

However, from FIG. 5, it may be visually recognized at first glance that when the irregular electrode pattern 20 according to the preferred embodiment of the present invention and another mesh pattern are formed to be intersected with each other, interference due to the moiré phenomenon is hardly generated. In the case in which the electrode pattern 20 of the touch sensor is formed in a single layer, the moiré phenomenon which may be generated by the overlap with the black matrix of the display unit coupled to a lower portion of the touch sensor may be alleviated, and the moiré phenomenon which may be generated by the overlap between the electrode patterns 20 formed by two electrode layers to be described below may also be prevented.

Figure 6:
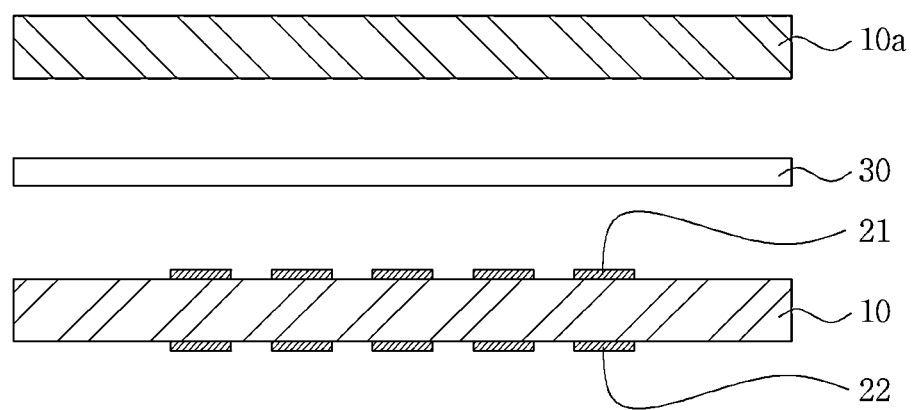
FIG. 6 is a cross-sectional view of a touch sensor according to another preferred embodiment of the present invention.
Figure 7:
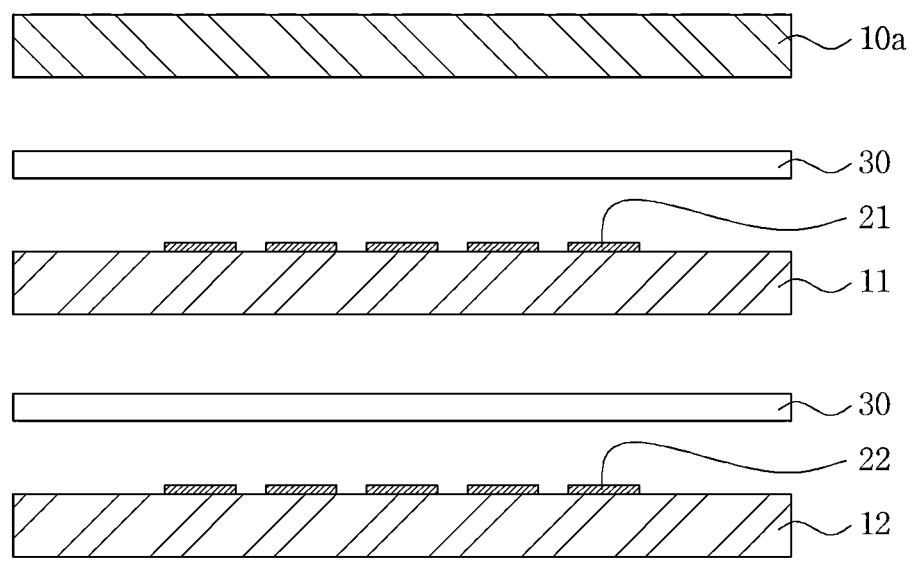
FIG. 7 is a cross-sectional view of a touch sensor according to still another preferred embodiment of the present invention.

FIG. 6 is a cross-sectional view of a touch sensor according to another preferred embodiment of the present invention and FIG. 7 is a cross-sectional view of a touch sensor according to still another preferred embodiment of the present invention.

The touch sensor according to another preferred embodiment of the present invention may include a transparent substrate 10, first electrode patterns 21 formed to be in parallel with one another in one direction on one surface of the transparent substrate 10, and second electrode patterns 22 formed on the other surface of the transparent substrate 10 and formed in a direction intersected with the first electrode pattern 21, where the first electrode pattern 21 and the second electrode pattern 22 may be formed in a mesh pattern and the mesh pattern may include at least one of the irregular unit patterns 20a.

The touch sensor according to another embodiment of the present invention has a structure of touch sensor in which the first electrode patterns 21 and the second electrode patterns 22 are formed on both surfaces of the transparent substrate 10 in a direction intersected with each other, as shown in FIG. 6. In this case, the moiré phenomenon at portions at which the first electrode patterns 21 and the second electrode patterns 22 are overlapped with each other may become a problem. However, as discussed above, the first electrode patterns 21 and the second electrode patterns 22 are formed in the irregular mesh pattern, such that the moiré phenomenon which may be generated between the electrodes 20 is prevented, thereby making it possible to improve the visibility of the touch sensor.

The touch sensor according to another preferred embodiment of the present invention may include a first transparent substrate 11, first electrode patterns 21 formed to be in parallel with one another in one direction on one surface of the first transparent substrate 11, a second transparent substrate 12, and second electrode patterns 22 formed to be in parallel with one another in a direction intersected with the first electrode patterns 21 on one surface of the second transparent substrate 12, where the first electrode pattern 21 and the second electrode pattern 22 may be formed in a mesh pattern, the mesh pattern may include at least one of the irregular unit patterns 20a, and the first transparent substrate 11 and the second transparent substrate 12 may be bonded so that the other surface of the first transparent substrate 11 faces the second electrode patterns 22 of the second transparent substrate 12.

The touch sensor of another embodiment of the present invention has the first electrode patterns 21 and the second electrode patterns 22 formed on the first transparent substrate 11 and the second transparent substrate 12, respectively. Even in this case, as the first electrode patterns 21 and the second electrode patterns 22 are overlapped with each other in a field of view of the user of the touch sensor, the moiré phenomenon may become a problem. Therefore, the first electrode patterns 21 and the second electrode patterns 22 are formed in the irregular mesh pattern as described in the preferred embodiment of the present invention, such that the visibility problem of the electrode patterns 21 and 22 due to the moiré phenomenon may be solved. Here, the first transparent substrate 11 and the second transparent substrate 12 may be adhered by a transparent adhesive layer 30.

The touch sensor according to another embodiment and still another embodiment of the present invention may further include a window substrate 10a on an upper surface in which the electrode patterns 21 and 22 are exposed, as shown in FIGS. 6 and 7. Here, the window substrate 10a, which serves as a protective layer of the touch sensor, is not limited to a nominal window substrate 10a and various protective layers may be formed by various insulating layers. Materials of the window substrate 10 may be selected and applied equally with the above-described transparent substrate 10.

Besides, since the transparent substrate, the first transparent substrate 11, the second transparent substrate 12, the first electrode pattern 21, and the second electrode pattern 22 have the same configuration and acting effects as those of the transparent substrate and the electrode pattern 20, respectively, described in the preferred embodiment of the present invention, the overlapped detail description thereof will be omitted.

According to the preferred embodiments of the present invention, the entire visibility of the touch sensor may be improved by alleviating the recognition by the user for the electrode pattern of the touch sensor.

In addition, the entire visibility of the touch sensor may be improved by preventing the moiré phenomenon in which may be generated between the metal mesh patterns to decrease the visibility of the electrode pattern.

In addition, the image quality of the image output from the display unit may be further improved by preventing the moiré phenomenon which may be generated due to the overlap of the black matrix and the electrode pattern on the display unit coupled to the touch sensor in advance.

In addition, the mesh pattern may be easily designed and productivity of the mesh pattern may be substantially improved by defining a series of relationships such as the shape, the number, or the like of the unit patterns forming the electrode pattern of the touch sensor as the specific relationship equation.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A touch sensor, comprising:
a transparent substrate; and
an electrode pattern formed on the transparent substrate, wherein
the electrode pattern is formed in a mesh pattern and the mesh pattern includes an irregular unit pattern comprising polygons satisfying the following relationship:

$$f(r) = \frac{1}{\sigma\sqrt{2\pi}} \exp\left(\frac{-r^2}{2\sigma^2}\right)$$

wherein r is a radius of the irregular unit pattern, σ is a standard deviation and set to a value of between 0 and 1, and f(r) is a frequency of the irregular unit pattern.

2. The touch sensor as set forth in claim 1, wherein the electrode pattern is formed of copper (Cu), aluminum (Al), gold (Au), silver (Ag), titanium (Ti), palladium (Pd), chromium (Cr), nickel (Ni) or a combination thereof.

3. The touch sensor as set forth in claim 1, wherein the radius is determined by an approximately circular shape formed by connecting outer peripheries of the polygons.

4. The touch sensor as set forth in claim 1, wherein an average number of vertices formed in unit patterns of the irregular unit pattern is between 5 and 8.

5. The touch sensor as set forth in claim 1, wherein a number of vertices formed in unit patterns of the irregular unit pattern is most commonly between 5 and 7.

6. A touch sensor, comprising:
a transparent substrate,
first electrode patterns formed to be in parallel with one another in one direction on one surface of the transparent substrate, and second electrode patterns formed on the other surface of the transparent
substrate and formed in a direction intersected with the first electrode pattern, wherein
the first electrode pattern and the second electrode pattern are formed in a mesh pattern and the mesh pattern includes an irregular unit pattern comprising polygons satisfying the following relationship:

$$f(r) = \frac{1}{\sigma\sqrt{2\pi}} \exp\left(\frac{-r^2}{2\sigma^2}\right)$$

wherein r is a radius of the irregular unit pattern, σ is a standard deviation and set to a value of between 0 and 1, and f(r) is a frequency of the irregular unit pattern.

7. The touch sensor as set forth in claim 6, wherein the electrode pattern is formed of copper (Cu), aluminum (Al), gold (Au), silver (Ag), titanium (Ti), palladium (Pd), chromium (Cr), nickel (Ni) or a combination thereof.

8. A touch sensor, comprising:
a first transparent substrate;
first electrode patterns formed to be in parallel with one another in one direction
on one surface of the first transparent substrate; a second transparent substrate; and
second electrode patterns formed to be in parallel with one another in a direction intersected with the first electrode patterns on one surface of the second transparent substrate, wherein
the first electrode pattern and the second electrode pattern are formed in a mesh pattern, the mesh pattern is formed by an irregular unit pattern comprising polygons satisfying the following relationship:

$$f(r) = \frac{1}{\sigma\sqrt{2\pi}} \exp\left(\frac{-r^2}{2\sigma^2}\right)$$

wherein r is a radius of the irregular unit pattern, σ is a standard deviation and set to a value of between 0 and 1, and f(r) is a frequency of the irregular unit pattern, and
the first transparent substrate and the second transparent substrate are bonded so that the other surface of the first transparent substrate faces the second electrode patterns of the second transparent substrate.

9. The touch sensor as set forth in claim 8, wherein the electrode pattern is formed of copper (Cu), aluminum (Al), gold (Au), silver (Ag), titanium (Ti), palladium (Pd), chromium (Cr), nickel (Ni) or a combination thereof.

* * * * *